United States Patent [19]
Eggert, Jr. et al.

[11] 3,832,002
[45] Aug. 27, 1974

[54] AUTOMOTIVE RESTRAINT SYSTEM

[75] Inventors: Walter S. Eggert, Jr., Huntington Valley; Michael J. Pavlik, Norristown, both of Pa.

[73] Assignee: The Budd Company, Troy, Mont.

[22] Filed: Mar. 21, 1973

[21] Appl. No.: 343,321

[52] U.S. Cl.................. 297/216, 297/385, 297/389
[51] Int. Cl. ............................................ B60r 21/10
[58] Field of Search .......... 297/216, 385, 386, 389; 280/150 SB

[56] References Cited
UNITED STATES PATENTS

| | | | |
|---|---|---|---|
| 2,899,146 | 8/1959 | Barecki | 297/389 X |
| 3,089,144 | 5/1963 | Cherup | 2/3 R |
| 3,414,322 | 12/1968 | Linderoth | 297/385 X |
| 3,424,495 | 1/1969 | Cherup | 297/385 X |
| 3,501,200 | 3/1970 | Ohta | 297/216 X |
| 3,552,795 | 1/1971 | Perkins et al. | 297/216 |
| 3,730,586 | 5/1973 | Eggert | 297/216 |

Primary Examiner—James C. Mitchell

[57] ABSTRACT

Vehicle seat safety system in which the occupant or passenger is closely restrained in the seat; the seat back is yieldably restrained in attenuation at a first and lower impact range for forward tilting movement with the occupant; and the seat is yieldably restrained in attenuation at a second and higher range for forward movement of the body and seat as a whole—to first allow the upper portion of the body or torso to move forward under lighter impact loadings, and to allow the body as a whole to move forward under greater impact loadings and thus to minimize, as far as possible, the impact loads on the body and to reduce forward and reverse or snap-back loads on the body torso and neck.

12 Claims, 10 Drawing Figures 3,832,002

AUTOMOTIVE RESTRAINT SYSTEM

BACKGROUND

Seat belts used in vehicles are commonly made of nylon, dacron and other high strength materials. While these materials, of the type and size normally used, have adequate holding strength they have considerable elastic stretch, 15 percent or 18 percent or more, upon forward impact of the vehicle to store elastic energy so that at the end of initial impact the occupant is snapped back against the seat in secondary reverse impact, which can be almost as severe as the forward impact.

As a measure of protection of the occupant there have been various proposals for allowing the seat as a whole to move forward under restraint for absorbing the impact energy by various means. One such arrangement is disclosed in the application of W.S. Eggert Jr. Ser. No. 201,729, filed Nov. 24, 1971, now U.S. Pat. No. 3,730,586

However, in prior art systems the impact of collision still imposes high initial forces on the occupant and such systems generally have been considered unacceptable.

SUMMARY OF INVENTION

According to the present invention there are provided three controlling elements or systems which act successively according to the severity of impact to minimize forward and reverse accelerations with corresponding minimization of injury to the occupant.

First, a belt or harness is provided, as of polyester of suitable size, which has very little yield or stretch, with an elastic factor of elongation or deformation of 5 percent and preferably less than 3 percent, to hold the occupant closely against the seat back and control the movement of the occupant during impact.

Second, the seat back is provided with a yieldable attenuating energy-absorbing (E/A) element between seat back and base which becomes effective at a first and lower range of impact to allow the closely restrained upper body portion or torso of the occupant to move forward with the seat back under controlled restraint before the body as a whole moves forward.

Third, the seat as a unit is provided with a yieldable attenuating energy-absorbing (E/A) element between the seat base and the car floor attachment which becomes effective at a second and higher range of impact to allow the body as a whole, now inclined forwardly with the seat back, to move forward under controlled restraint.

DRAWINGS

The invention will be described in connection with an exemplary embodiment showin in the accompanying drawings, wherein.

SPECIFIC EMBODIMENT

Figure 3:
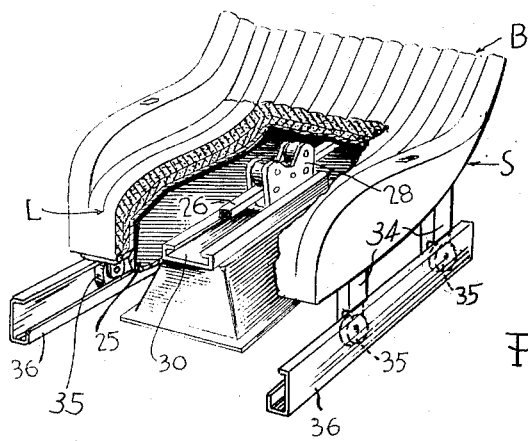
FIG. 3 is a partial perspective view of the lower seat portion and base.
Figure 1:
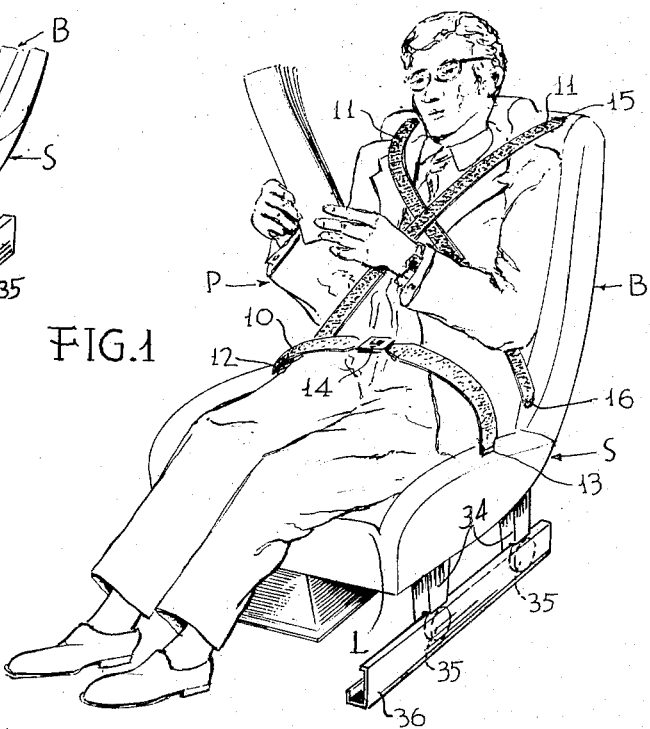
FIG. 1 is a front and side perspective elevation of a vehicle seat with an occupant restrained in the seat in accordance with the present invention.

A passenger or occupant P is shown, FIG. 1, in a seat S, the occupant resting on the ledge or seat proper L and being supported behind by a seat back B. A lap belt 10 and shoulder belts 11 for both shoulders secure the occupant in the seat.

One side of the seat lap belt 10 is rigidly anchored, as at 12, and the other end is yieldably held, as at 13, by an inertia-lock reel of known type, which yields against spring return at a slow pull-out rate of movement to fit the body and which locks against pull-out at a rapid rate of movement, as on collision impact acceleration of the body. Such inertia reels are well known per se and need no illustration. The seat belt has the usual releasable buckle 14.

The shoulder belts 11 are mounted on inertial reels at the top of the seat back, as at 15, and are releasably secured to fixed anchors at the sides of the seat back, as at 16, by catches or latches of any suitable type.

The belts are made of a size and material, such as polyester, so as to have a very low stretch to avoid extensive yield and snap-back inherent in belts now in common use. Present belts have an elongation of 15 percent or more under collision impact loading of a 50 percent man (170 lbs.) at 30 m.p.h. According to the present invention the belts will have an elongation factor of 5 percent and preferably less than 3 percent under occupant load during impact under the same conditions. This belt arrangement holds the occupant closely in place during the forward deceleration of the vehicle as a result of collision impact.

Figure 2:
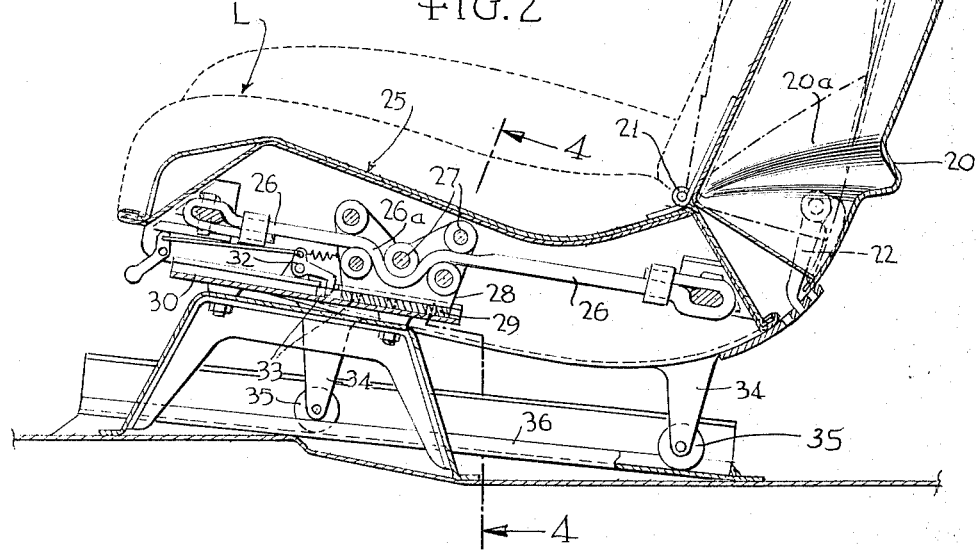
FIG. 2 is an enlarged longitudinal vertical sectional view of the seat alone.

For higher rates of deceleration it is arranged that the upper portion of the occupant's body, or torso and head, will move forward while the body as a whole is restrained against forward movement. To provide for this the seat back B, which here includes transversely spaced box-like column sections connected by a thin web, is formed with a yieldable portion or element which is here made in the form of a corrugation or accordion pleated portion 20. The corrugation tapers out forwardly on the sides of the box-like formation, as at 20a. With this arrangement the forward movement of the body, added to by the weight of the seat back, pulls the upper end of the seat back forward under attenuating restraint of the yieldable portion 20, which restraint increases as the corrugation is pulled out, as shown in broken lines in FIG. 2, until finally there is the full resistance of the seat back material in the final stage of yieldability.

The seat back shown is of the type which can be swung forward for passenger convenience. It is mounted on hinges 21 and held in erect position by latches 22.

This arrangement provides that the upper body torso will move forward with the seat back by a limited distance, say 6 inches, relative to the seat base, at impact loading of a given range, say 10 g., without material overshoot, increased acceleration of the body, or rebound.

Means are provided for the seat as a whole to move forward relative to the vehicle floor attachment, say 6 inches, under yieldable restraint at a higher range of dynamic impact loading, say 20 g., thus providing an upper body or torso movement of, say 12 inches, and a lower body movement of, say 6 inches, relative to the vehicle body.

One embodiment of such means alone is disclosed in the copending application referred to above. In that embodiment the body-restraining or impact-attenuating means for the seat is shown to comprise bendable rods and rod-bending means at each side of the seat. Herein, a single attenuating means is shown and at the center of the seat. It is to be understood that the attenuating means may take a wide variety of forms other than that illustrated, the essential requirement being that the attenuating means be disposed between the seat and the seat supporting attachment to the body floor.

The seat frame 25 carries in the transverse middle portion a bendable rod 26 which is embraced at an intermediate portion of its length 26a by a set of bending elements or rollers 27 carried by a supporting frame 28 which has a lower slide portion 29 mounted in a retaining guide track 30 firmly secured to the floor of the vehicle.

If the seat is to have longitudinal adjusted positions, as is usual, the slidable frame 28 is provided with a latch 32 adapted to enter a selected notch or hole of a series of securing notches or holes 33 provided in the base guide track 30.

It will be realized that the arrangement might be reversed, the frame with bending elements being carried by the seat base and the bendable rod being carried being carried by a frame adjustably mounted on the track rails.

As shown herein, the seat at the sides is provided with depending support elements or legs 34 carrying rollers 35 riding in guide tracks 36 secured to the floor.

The seat restraint arrangement is designed to have increasing resistance to movement as the impact loadings increase. To provide for this the rod 26 at its intermediate portion 26a is made of varying cross-sectional shape, being thin and wide in the center and thicker and narrower beyond. This provides a lower initial bending modulus and an increasing subsequent bending modulus. Preferably, however, the cross-sectional area of the rod is the same uniformly throughout its length so it will have the same tensile strength throughout its length.

This arrangement assures that the passenger or occupant will still be restrained with the seat, though in a forward tilted position, for limited forward movement, say 6 inches, without substantial snap-back while still securely held against uncontrolled forward movement of the body relative to the vehicle. That is, the upper portion of the body will have a total movement of about 12 inches which will avoid impact with parts of the vehicle.

Figure 5:
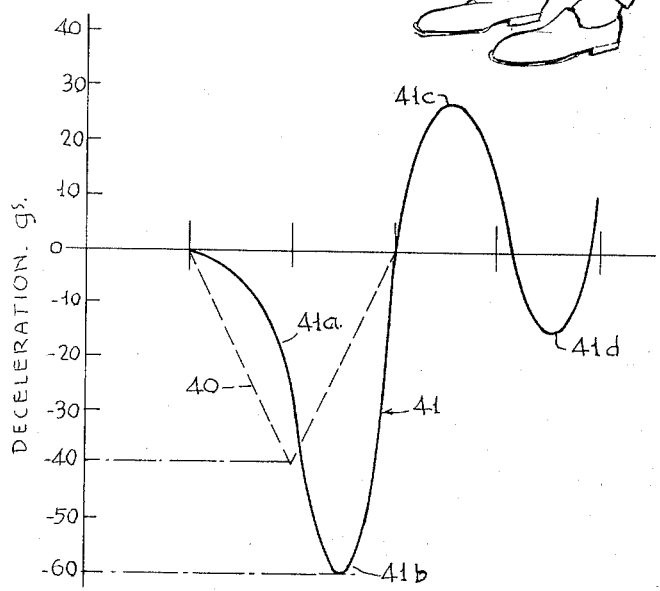
FIG. 5 is a diagram of time-deceleration showing body torso reaction to impact loadings when held by seat belts or harness now commonly used.
Figure 6:
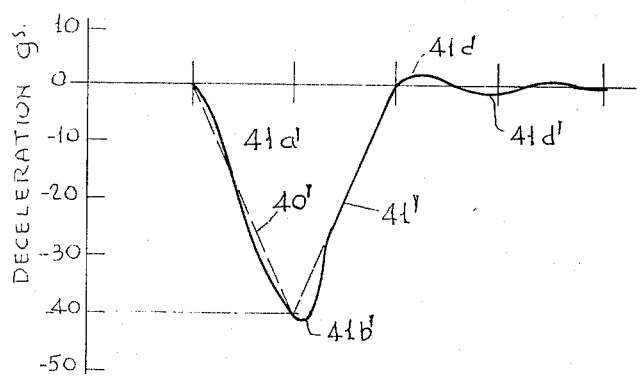
FIG. 6 is a diagram of time-deceleration showing body torso reaction to impact loadings when closely held against the seat back according to the present invention.
Figure 4:
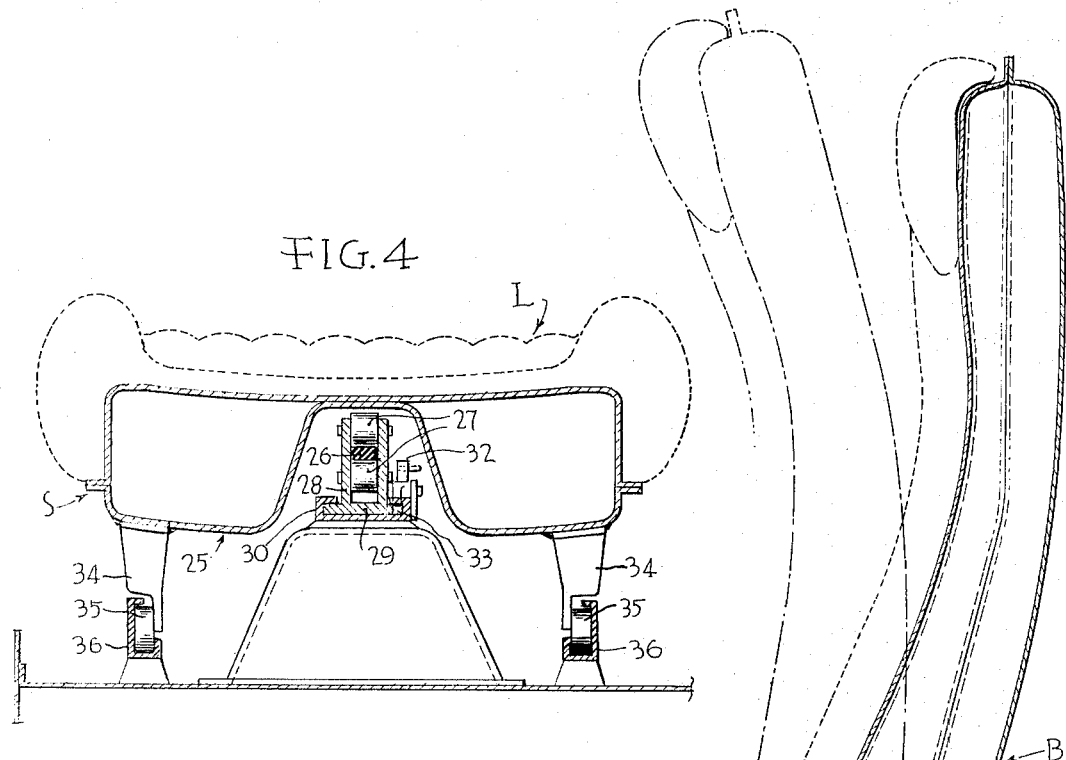
FIG. 4 is a further enlarged local transverse section taken on the line 4—4 of FIG. 2.

FIGS. 5 and 6 show the advantages of closer restraint of the body torso to the seat back, FIG. 5 being a diagram of present yieldable body restraining means and FIG. 6 being a similar diagram of the close restraint according to the present invention.

The broken line triangular configuration 40 in FIGS. 5 and 6 represents a usual assumed crash pulse input loading with a 0.10 sec. duration and 40 g. peak loading, the ordinate being g. or gravity acceleration loadings and the abscissa being time.

FIG. 5 shows the occupant response, line 41, with existing seat belt restraint systems having an elongation of about 15 percent. The dynamic overshot, at 41a, is quite significant and the occupant acceleration, at 41b, is about 50 percent higher than the input acceleration. More significantly, the rebound, at 41c, 41d, is very severe, amounting at 41c to about two-thirds of the impulse acceleration, meaning neck snap.

In FIG. 6, with restraint of less than about 5 percent elongation according to the present invention, the overshoot, at 41a', is almost eliminated; the occupant acceleration, at 41b', is also almost eliminated; and the rebound, at 41c', 41d', is very slight.

FIGS. 7–10 show the torso and head response relative to the car body response at the B post, that is at the seat anchorage, in deceleration-time.

Figure 7:
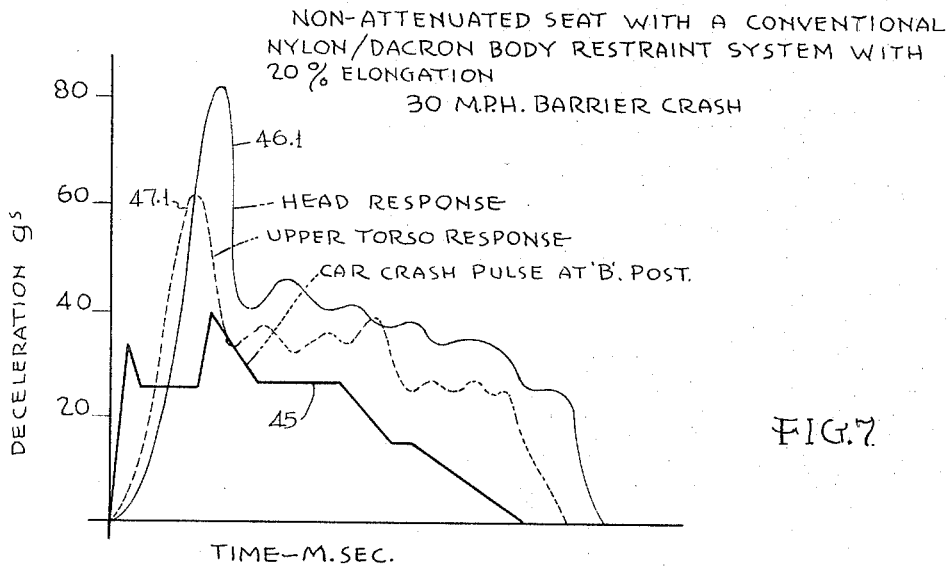
FIG. 7 is a diagram of time-deceleration showing the relative response of head and upper body torso with conventional body restraint systems.

FIG. 7 shows the head and upper torso response with a usual non-attenuated seat and the usual body restraint belt system having an elongation of about 20 percent at a 30 m.p.h. barrier crash with a 50 percent man (170 lbs.). Line 45 indicates the crash pulse at the B post location. This shows a first peak at about 35 g. deceleration, a second peak at about 40 g. deceleration, and a latter return to zero. The line 46.1 shows the upper torso response. This is delayed relative to the car body response but, due to the added acceleration after the initial crash impact, has an overshoot up to about 60 g. deceleration. The head response, line 47.1, peaks to about 80 g. deceleration.

Figure 8:
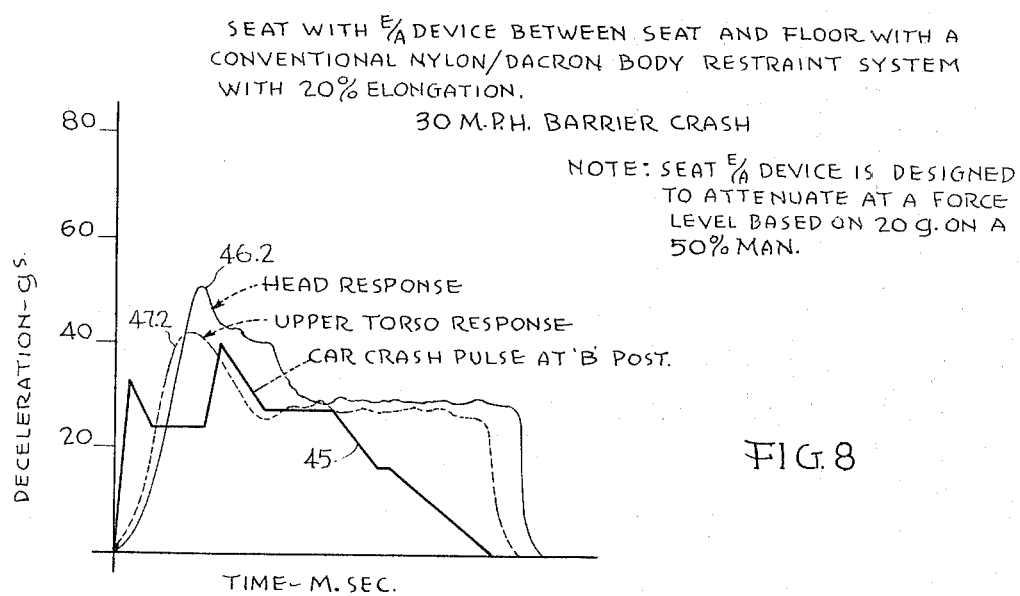
FIG. 8 is a diagram of time-deceleration showing the relative response of head and upper body torso with the energy absorbing system between the seat base and car floor attachment.

FIG. 8 is a diagram similar to FIG. 7 for the same crash conditions but with seat-to-car restraint attenuation added. The same car crash pulse 45 at the B post is experienced but the peak torso response 46.2 has been reduced to about 40 g. deceleration and the peak head response 47.2 has been reduced to about 50 g. deceleration.

Figure 9:
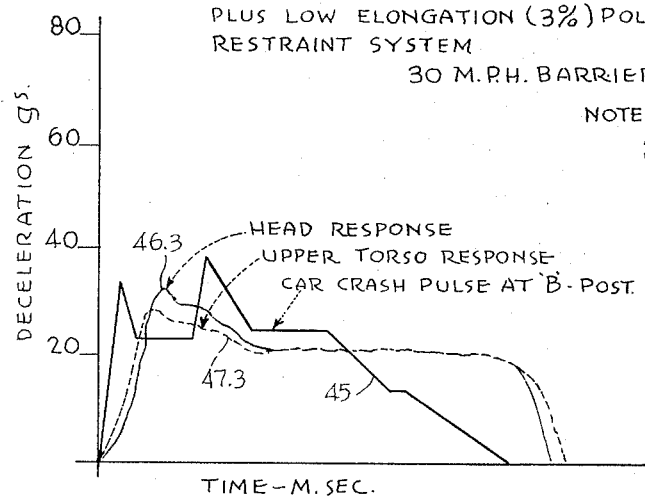
FIG. 9 is a diagram of time-deceleration showing the relative response of head and upper body torso with the energy absorbing system between seat and car base, plus the improved body restraining system.

FIG. 9 is a diagram similar to FIG. 7 for the same crash conditions but with both seat-to-car restraint attenuation system and the improved low-elongation body-belt restraint system. Again the car crash pulse 45 is the same as before but the peak torso response 46.3 has been reduced to about 25 g. deceleration and the peak head response 47.3 has been reduced to about 30 g. deceleration.

Figure 10:
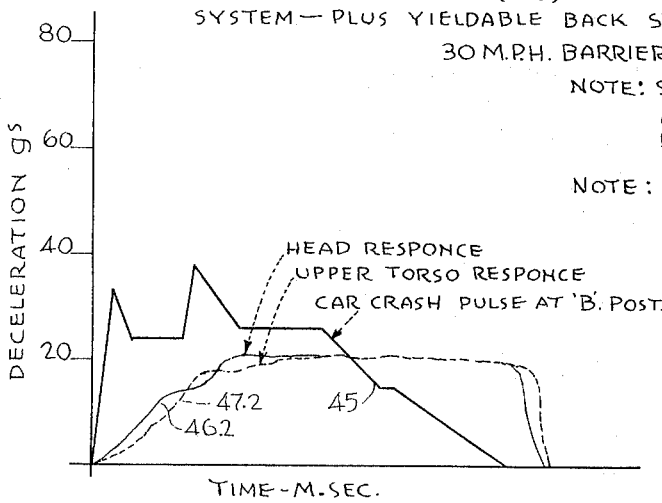
FIG. 10 is a diagram of time-deceleration showing the relative response of head and upper body torso with the energy absorbing system between the seat base and car floor, plus the improved body restraint system, plus the yieldable energy-absorbing system between the seat back and base.

FIG. 10 is a diagram similar to FIG. 7 for the same car crash conditions but with the seat-to-car restraint attenuation system, plus the improved low-elongation body-belt restraint system, plus the yieldable seat-back restraint attenuation system. The car crash pulse 45 is the same as before but the peak body torso response 46.2 and the peak head response 47.2 have both been reduced to slightly above 20 g. deceleration. Also the slope of the lines 47.2 and 47.2 from initial zero to peak has been greatly reduced, meaning a much less abrupt snap on the body at impact.

It is thus seen that the invention provides improved means for alleviating the shock on an occupant when the vehicle encounters a barrier crash.

While one embodiment of the invention has been disclosed for purposes of illustration, it is to be understood that there may be verious embodiments and modifications within the scope of the invention.

What is claim is:

1. A vehicle seat safety system comprising a seat having a ledge and back, occupant lap and shoulder belt means carried by the seat which closely holds the occupant in the seat, the belt means having an elongation factor of less than 15 percent (15 percent), a yieldable attenuating restraining means for the seat back which yields upon predetermined loading to allow the seat back to tilt forward with the closely confined body torso of the occupant, and a yieldable attenuating restraining means for the seat ledge which yields upon forward impact loading, said yieldable seat back restraining means being yieldable at a lower loading than the yieldable restraining means for the seat ledge.

2. A vehicle seat safety system as set forth in claim 1, wherein the belt means has an elongation factor of less than 5 percent.

3. A vehicle seat safety system as set forth in claim 1, wherein the belt means has an elongation factor of less than 3 percent.

4. A vehicle seat safety system as set forth in claim 1, wherein shoulder belts are provided for both of the occupant's shoulders, the shoulder belts being secured at their upper ends to the top of the seat back.

5. A vehicle seat safety system as set forth in claim 1, wherein the yieldable restraining means for the seat back has increasing resistance to tilting after the yielding stage.

6. A vehicle seat safety system as set forth in claim 5, wherein said yieldable restraining means for the seat back comprises a corrugation in the back adjacent its lower end which is pulled out when the seat back tilts forward at the top upon impact.

7. A vehicle seat safety system as set forth in claim 6, wherein the seat back is hinged at the bottom and provided with a latch connection below the corrugation.

8. A vehicle seat safety system as set forth in claim 1, wherein the yieldable restraint means for the seat ledge imposes increasing restraint as impact loading increases.

9. A vehicle seat safety system as set forth in claim 1, wherein the yieldable restraining means for the seat back begins to yield at about 10 g., and the yieldable restraining means for the seat ledge begins to yield at about 20 g.

10. A vehicle seat safety system as set forth in claim 1, wherein the belt means has an elongation factor of less than 3 percent.

11. A vehicle seat safety system comprising a seat having a ledge and back, occupant lap and shoulder belt means carried by the seat which closely holds the occupant in the seat, the belt means having an elongation factor of less than 15 percent, a yieldable attenuating means for the seat back which yields upon predetermined loading to allow the seat back to tilt forward with the closely confined body torso of the occupant, and a yieldable attenuating restraining means for the seat ledge which yields upon forward impact loading.

12. A vehicle seat safety system as set forth in claim 11, wherein the yieldable restraint means for the seat ledge is located intermediate the length of the seat, and track and slide support means for the seat located at the ends of the seat.

* * * * *